UNITED STATES PATENT OFFICE 2,585,681

ANTIGAS FADING ANTHRAQUINONE DYES

David I. Randall, Easton, Pa., and Edgar E. Renfrew, Phillipsburg, N. J., assignors to General Aniline & Film Corporation, New York, N. Y., a corporation of Delaware No Drawing. Application December 10, 1949, Serial No. 132,391

6 Claims. (Cl. 260—378)

The present invention relates to dyestuffs of the anthraquinone series which are particularly useful for dyeing acetate rayon and which yield violet or bluish-violet shades thereon.

We have discovered a series of new and valuable dyestuffs which are essentially hydroxyethoxymethyl phenylaminoanthraquinones and derivatives thereof having the general formula:

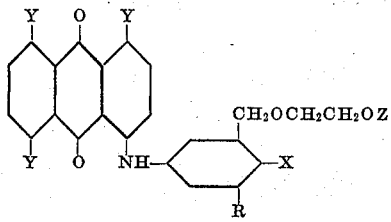

wherein X is selected from the group consisting of hydrogen and methyl, R is selected from the group consisting of hydrogen and $CH_2OCH_2CH_2OZ$, Z is selected from the group consisting of hydrogen, hydroxy alkyl and alkoxy alkyl, and Y is selected from the group consisting of hydrogen, hydroxy and

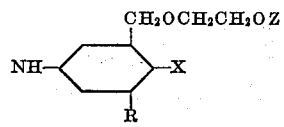

These compounds exhibit substantially enhanced substantivity for acetate rayon and in addition they have the ability to withstand the action of acid-gas fumes such as the combustion products of industrial and engine fuels. This property is a very important one, as most existing dyestuffs which color cellulose acetate in violet and blue shades fade badly when exposed to acid-gas fumes; certain previously reported products which do have good gas-fading fastness have other disadvantages such as poor fastness to light. In the 1-hydroxy-4-arylaminoanthraquinones described herein, we have discovered a series of bluish violet dyestuffs which combine the desirable properties of good substantivity and good light fastness, washfastness and gas fume fastness.

The compounds described herein which are 1,4-diarylaminoanthraquinones are characterized by good substantivity and by good fastness to washing and to light. The good substantivity is remarkable; no other greenish dyestuffs in the anthraquinone series which have such good substantivity are known; usually compounds of comparable molecular weight have virtually no affinity for acetate rayon. The washfastness is excellent and the gas fastness much superior to known compounds; undyed acetate fiber in the washing test vessel picks up no stain.

The following examples are illustrative of preferred embodiments of the invention but it will be understood that variations and substitutions may be made within the scope of the claims.

Example 1

In a suitable vessel, a mixture of 19.2 parts by weight quinizarin, 4.8 parts leucoquinizarin, 18.1 parts 2-(5-amino-o-tolylmethoxy) ethanol, 12.0 parts boric acid and 160.0 parts absolute alcohol was maintained at the reflux temperature of the solvent while stirring. The contents of the vessel were allowed to cool to room temperature and the material which settled was collected by decantation and filtration. The filter cake was stirred for two hours with 800.0 parts hot water which contained 5.6 parts sodium hydroxide, during this time, the temperature was maintained at 80° C. and the stream of air was bubbled through the mixture. The solid was isolated by filtration and restirred for twenty minutes with a hot solution of 800.0 parts water and 5.6 parts sodium hydroxide. The solid was separated by filtration and the preceding step in the procedure was repeated. The cake after washing with water and drying weighed 24 parts.

It has the structure:

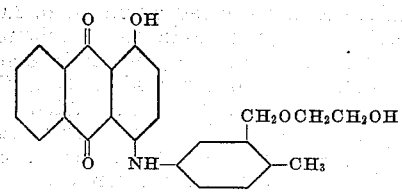

After dispersion with a suitable agent, for instance, Marasperse CB made by the Marathon Corporation, Rothschild, Wisc. (as prepared in USP 2,371,136) the product dyed cellulose acetate bright bluish-violet shades in good strength. The dyeings showed excellent fastness to washing, to light and to combustion gas fumes.

Example 2

The dyestuff of the structure:

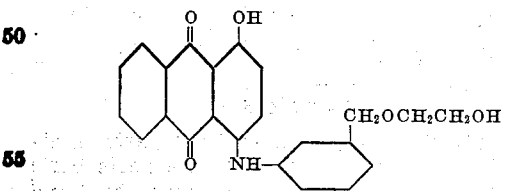

was prepared exactly as was the product of Example 1, except that the 2-(5-amino-o-tolylmethoxy) ethanol was replaced by 16.7 parts of 2-m-aminobenzyloxyethanol. The dyestuff when prepared as a dispersed powder yielded violet shades on cellulose acetate. The substantivity of the dyestuff was very good, and the fastness to light, washing and gas fading was excellent.

*Example 3*

The product of the structure:

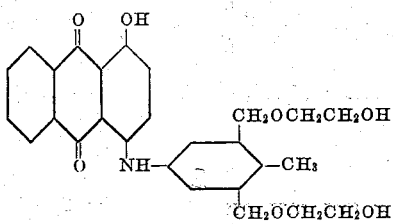

was prepared according to the method of Example 1, except that 25.5 parts of 2,2'-(4-amino-2,6-tolylenedimethoxy) diethanol was used instead of the 2-(5-amino-o-tolylmethoxy) ethanol. The product, after dispersion with a suitable agent yielded full bright bluish-violet shades on cellulose acetate fiber. The properties, especially gasfastness, washfastness and lightfastness were excellent.

*Example 4*

The compound of the structure:

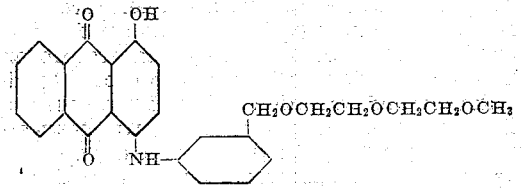

was prepared like the product of Example 1 except that 22.5 g. of α-2-(2-methoxyethoxy) ethoxy-m-toluidine was used instead of 2-(5-amino-o-tolylmethoxy) ethanol. It yielded bluish violet shades of good properties when dyed on cellulose acetate fiber.

*Example 5*

In a suitable vessel was charged 9.0 parts of quinizarin, 3.0 parts of leucoquinizarin, 6.0 parts boric acid, 14.7 parts 2-(2-m-aminobenzyloxyethoxy) ethanol and 96.0 parts absolute ethanol. The mixture was maintained at 80° C. while stirring for sixteen hours. Then was added 3.5 parts sodium perborate in 25.0 parts water. Heating was continued for one hour, after which was added 200 parts water. Separation occurred, and the liquid phase was discarded. The solid material was leached twice with hot dilute base in essentially the same way as described in Example 1. The product dyed acetate rayon in rich violet shades of excellent properties. It has the structure

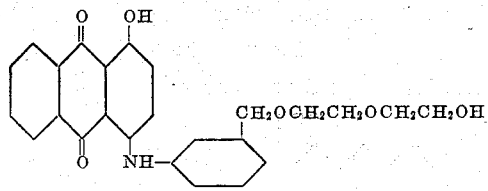

*Example 6*

In a suitable vessel was placed 10.0 parts quinizarin, 5.9 parts leucoquinizarin, 11.8 parts boric acid, 26.2 parts 2-m-aminobenzyloxy ethanol and 93.0 parts Cellosolve. The mixture was maintained at 90-95° C. for sixteen hours. The solution was poured into a 2500 parts water, and the material which separated was isolated by decantation. The semi-solid product was dissolved in 180 parts acetone and the solution poured into 660 parts warm sodium hydroxide solution (1.8%) and the solid which settled out was again dissolved in acetone and reprecipitated from aqueous base. The solid was collected on a filter, washed and dried. When suitably dispersed, this material colored cellulose acetate fibers strongly in beautiful blue-green shades of good fastness to acid gas fumes and excellent fastness to light and washing. It has the structure:

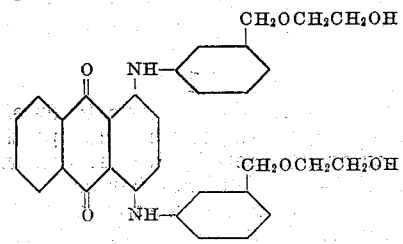

*Example 7*

The dyestuff of the structure:

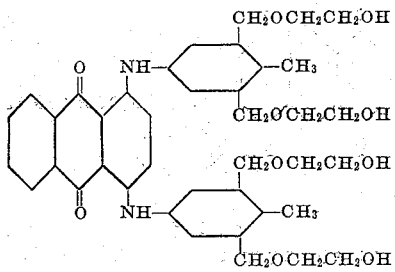

was made by the same procedure as the product in Example 6, except the 2-m-aminobenzyloxyethanol is replaced by an equivalent amount of 2-(5-amino-o-tolyl-methoxy) ethanol. The properties of the product are similar to those of the product of Example 6.

*Example 8*

The dyestuff of the structure:

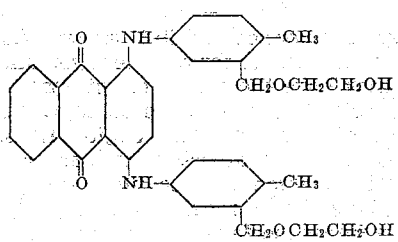

was made by the same procedure as the product in Example 6, except that 2-m-aminobenzyloxyethanol was replaced by an equivalent amount of 2-(5-amino-o-tolylmethoxy) ethanol. The properties of the product were similar to those of the product of Example 6.

*Example 9*

In a suitable vessel was placed 27.4 parts leucotetraoxyanthraquinone, 16.7 parts 2-m-aminobenzyloxyethanol, 12.0 parts boric acid and 180.0 parts absolute ethanol. The mixture was heated at the boiling point for sixteen hours while being stirred. To the mixture was added 800.0 parts water containing 50 parts aqueous sodium hydroxide solution (20%) and the new mixture heated. The components were separated by decantation, and the semi-solid product treated by this procedure twice more. The isolated product was then boiled one hour with 300 parts nitrobenzene and the solvent removed by steam distillation. The solid residue was isolated and dried. On dispersion it yielded blue dyeings of good properties on cellulose acetate fibers. It has the structure:

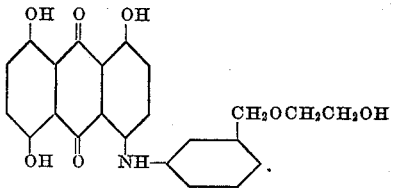

*Example 10*

In a suitable vessel were placed 19.9 parts 4,8-dibromoanthrarufin, 38.3 parts 2,2'-(4-amino-2,6-tolylenedimethoxy) diethanol, 16.4 parts freshly fused sodium acetate, 1.0 part cuprous chloride, 0.5 part copper powder and 200.0 parts nitrobenzene. The mixture was heated at 130° C. for eighteen hours, then at 165° C. for sixteen hours more; during these periods it was stirred. The nitrobenzene was driven off with steam and the remaining solid was separated from water by filtration. After crystallization from chlorobenzene, the product dyed cellulose acetate fibers in attractive blue shades which showed good properties in washing tests, Fadeometer tests and combustion fume tests. The dye has the structure:

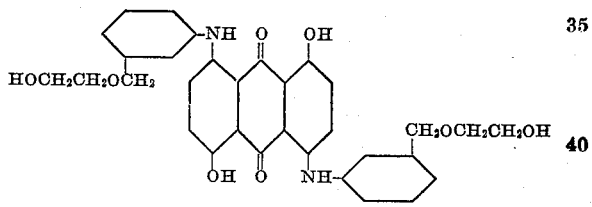

We claim:

1. Dyestuffs of the general formula:

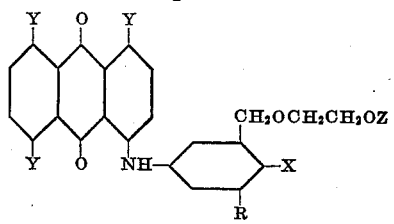

wherein X is selected from the group consisting of hydrogen and methyl, R is selected from the group consisting of hydrogen and

CH₂OCH₂CH₂OZ

Z is selected from the group consisting of hydrogen, hydroxy alkyl and alkoxy alkyl, and Y is selected from the group consisting of hydrogen, hydroxy and

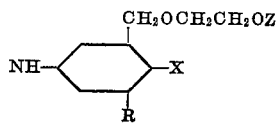

2. A dyestuff having the formula:

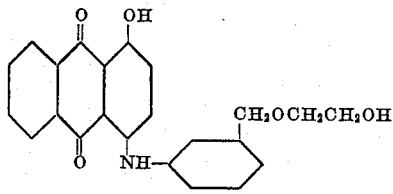

3. A dyestuff having the formula:

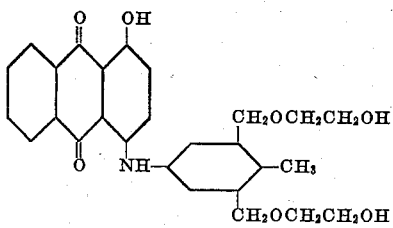

4. A dyestuff having the formula:

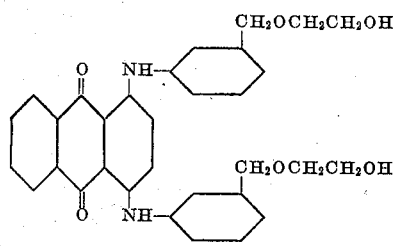

5. A dyestuff having the formula:

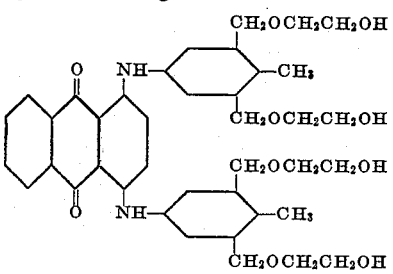

6. A dyestuff having the formula:

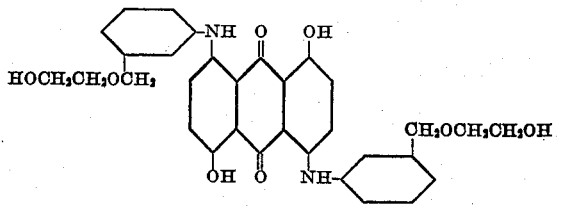

DAVID I. RANDALL.
EDGAR E. RENFREW.

REFERENCES CITED

The following references are of record in the file of this patent:

UNITED STATES PATENTS

| Number | Name | Date |
|---|---|---|
| 2,053,343 | Lodge et al. | Sept. 8, 1936 |
| 2,353,108 | Wuertz et al. | July 4, 1944 |

FOREIGN PATENTS

| Number | Country | Date |
|---|---|---|
| 593,955 | Great Britain | Oct. 30, 1947 |